(No Model.)
N. H. PROUTY.
HANDLE.
No. 488,679. Patented Dec. 27, 1892.
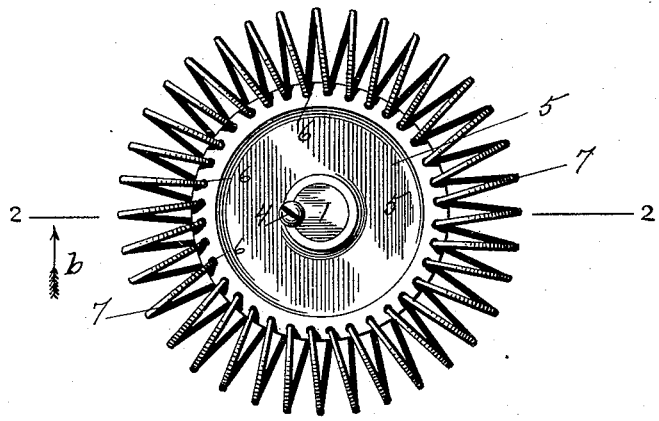
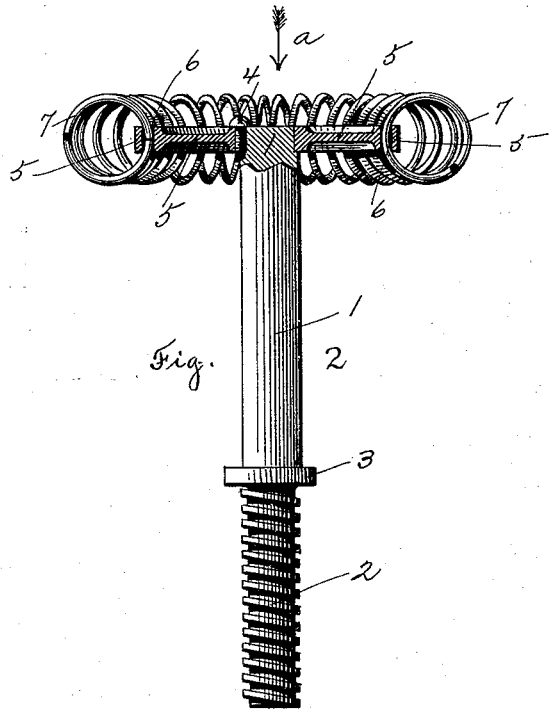
Witnesses
Chas. F. Schmelz
Katie Farrell
Inventor
Nelson H. Prouty,
By his Attorney
John C. Dewey
THE NORRIS PETERS CO., PHOTO-LITHO., WASHINGTON, D. C.

UNITED STATES PATENT OFFICE.

NELSON H. PROUTY, OF CHARLTON, MASSACHUSETTS.

HANDLE.

SPECIFICATION forming part of Letters Patent No. 488,679, dated December 27, 1892.

Application filed July 22, 1892. Serial No. 440,859. (No model.)

*To all whom it may concern:*

Be it known that I, NELSON H. PROUTY, a citizen of the United States, residing at Charlton, in the county of Worcester and State of Massachusetts, have invented certain new and useful Improvements in Handles; and I do hereby declare that the following is a full, clear, and exact description thereof, which, in connection with the drawings making a part of this specification, will enable others skilled in the art to which my invention belongs to make and use the same.

My invention relates to handles, and more particularly to non heat conducting handles, and to steam valve handles.

The object of my invention is to provide a handle, and more particularly a steam valve handle which will be substantially non heat conducting, and will be of very simple construction and inexpensive to make; and at the same time to retain the ordinary circular shape of the handle, and allow of the firm grasping thereof with the whole hand of the user, so that the hand will not slip on the periphery of the handle, as is the case in ordinary steam valve handles.

My invention consists in certain novel features of construction of a handle, and more particularly in combining with the circular end of a handle a spirally coiled wire, which is secured to the edge of the circular end, and forms the grasping surface of the handle, as will be hereinafter fully described.

Referring to the drawings:—Figure 1 is an end view of my improved handle, looking in the direction of arrow *a*, Fig. 2, and, Fig. 2 is a cross section, on line 2, 2, Fig. 1, looking in the direction of arrow *b*, same figure.

I have shown in the drawings my improvement applied to a steam valve handle.

In the accompanying drawings, 1 is the stem of a steam valve handle provided with a screw threaded end 2, and a collar 3, in the ordinary way. Upon the outer end of the stem 1 is secured, in this instance by a screw 4, a disk 5, which has a central hole therein, into which the end of the stem 1 extends, and a series of holes 6 in the outer edge thereof. A spirally coiled wire 7 is combined with the disk 5, and extends completely around and encircles the outer edge or periphery of the disk to form the handle portion. The wire 7 is preferably made in one piece, of sufficient size and strength to prevent its bending or getting out of shape when it is grasped and pressed in the hand, and is secured in the disk 5 by passing it through the holes 6 in the edge thereof, in the manner shown in the drawings. The free ends of the wire may be soldered or secured in one of the holes 6, as shown at the left in Fig. 2, so as to present a continuous spiral coil without a break or seam to be grasped by the hand.

In case the handle is used as a steam valve handle, the heat of the steam passing through the stem 1 to the disk 5, will pass off through the holes 6 in the disk, and the free circulation of the air through said holes 6, which are larger than the diameter of the wire 7, see Fig. 2, and through and between the coils of the wire 7, will prevent said wire from becoming heated.

The spiral coil formation of the grasping surface of the handle will enable the user to hold the handle firmly, and prevent the hand from slipping thereon.

I have described my improvement in handles in connection with steam valve handles, but it may be used in connection with any other handles, if desired.

The advantages of my improved handle will be readily appreciated by those skilled in the art. It is of very simple construction, very durable, and of pleasing and attractive appearance to the eye, and it may be used in place of ordinary handles for different purposes, whether the same are required to be non heat conducting or not.

I am aware that prior to my invention, coiled wire has been used in handles, and therefore I do not broadly claim the use of coiled wire in handles, but I am not aware that coiled wire has been used to make a handle of the description shown and claimed herein.

Having thus described my invention, what I claim as new, and desire to secure by Letters Patent is:—

As an improved article of manufacture, a handle, consisting of a disk, or circular plate provided with holes or openings in the edge thereof, and a coiled wire extending around the edge of said disk, and passing through the holes therein, substantially as shown and described.

NELSON H. PROUTY.

Witnesses:
JOHN C. DEWEY,
KATIE FARRELL.